(12) United States Patent
Casper et al.

(10) Patent No.: US 8,806,069 B2
(45) Date of Patent: *Aug. 12, 2014

(54) PROVIDING INDIRECT DATA ADDRESSING FOR A CONTROL BLOCK AT A CHANNEL SUBSYSTEM OF AN I/O PROCESSING SYSTEM

(71) Applicant: International Business Machines Corporation, Hillsboro, OR (US)

(72) Inventors: Daniel F. Casper, Poughkeepsie, NY (US); John R. Flanagan, Poughkeepsie, NY (US); Catherine C. Huang, Poughkeepsie, NY (US); Matthew J. Kalos, Tucson, AZ (US); Ugochukwu C. Njoku, Poughkeepsie, NY (US); Dale F. Riedy, Poughkeepsie, NY (US); Gustav E. Sittmann, III, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/945,272

(22) Filed: Jul. 18, 2013

(65) Prior Publication Data

US 2013/0304940 A1 Nov. 14, 2013

Related U.S. Application Data

(63) Continuation of application No. 13/351,073, filed on Jan. 16, 2012, now Pat. No. 8,516,161, which is a continuation of application No. 12/031,201, filed on Feb. 14, 2008, now Pat. No. 8,117,347.

(51) Int. Cl.
*G06F 3/00* (2006.01)
*G06F 3/06* (2006.01)

(52) U.S. Cl.
CPC .................................. *G06F 3/0659* (2013.01)
USPC ............................................................ 710/5

(58) Field of Classification Search
None
See application file for complete search history.

(56) References Cited

U.S. PATENT DOCUMENTS 4,004,277 A 1/1977 Gavril
4,374,415 A 2/1983 Cormier et al.
(Continued)

FOREIGN PATENT DOCUMENTS

DE 3931514 3/1990
GB 1264096 2/1972
(Continued)

OTHER PUBLICATIONS

"Information Technology-Fibre Channel Protocol for SCSI, Third Version (FCP-3)," T10 Project 1560-D, Revision 4g, Sep. 13, 2005, pp. 1-140.
(Continued)

*Primary Examiner* — Henry Tsai
*Assistant Examiner* — Aurangzeb Hassan
(74) *Attorney, Agent, or Firm* — Cantor Colburn LLP; Steven Chiu

(57) ABSTRACT

An computer program product, apparatus, and method for facilitating input/output (I/O) processing for an I/O operation at a host computer system configured for communication with a control unit. The computer program product is provided for performing a method including: obtaining a transport command word (TCW) for an I/O operation, the TCW specifying a location address and indicating whether the TCW directly or indirectly addresses a message for transmitting one or more commands to the control unit; extracting the specified location address from the TCW; obtaining the message from the specified location address based on the TCW indicating direct addressing, the message including one or more I/O commands; gathering one or more I/O commands from command locations specified by a list of addresses identified by the specified location address to form the message based on the TCW indicating indirect addressing; and forwarding the message to the control unit for execution.

20 Claims, 13 Drawing Sheets

(56) References Cited

U.S. PATENT DOCUMENTS

| | | | |
|---|---|---|---|
| 4,414,644 | A | 11/1983 | Tayler |
| 4,455,605 | A | 6/1984 | Cormier et al. |
| 4,779,188 | A | 10/1988 | Gum et al. |
| 4,837,677 | A | 6/1989 | Burrus, Jr. et al. |
| 4,866,609 | A | 9/1989 | Calta et al. |
| 4,870,566 | A | 9/1989 | Cooper et al. |
| 5,031,091 | A | 7/1991 | Wakatsuki et al. |
| 5,040,108 | A | 8/1991 | Kanazawa |
| 5,325,492 | A | 6/1994 | Bonevento et al. |
| 5,388,219 | A | 2/1995 | Chan et al. |
| 5,434,980 | A | 7/1995 | Casper et al. |
| 5,461,721 | A | 10/1995 | Cormier et al. |
| 5,500,942 | A | 3/1996 | Eickemeyer et al. |
| 5,517,670 | A | 5/1996 | Allen et al. |
| 5,526,484 | A | 6/1996 | Casper et al. |
| 5,528,755 | A | 6/1996 | Beardsley et al. |
| 5,539,918 | A | 7/1996 | Allen et al. |
| 5,546,533 | A | 8/1996 | Koyama |
| 5,584,039 | A | 12/1996 | Johnson et al. |
| 5,613,163 | A | 3/1997 | Marron et al. |
| 5,640,600 | A | 6/1997 | Satoh et al. |
| 5,758,190 | A | 5/1998 | Johnson et al. |
| 5,768,620 | A | 6/1998 | Johnson et al. |
| 5,787,071 | A | 7/1998 | Basso et al. |
| 5,831,985 | A | 11/1998 | Sandorfi |
| 5,860,022 | A | 1/1999 | Kondou et al. |
| 5,918,028 | A | 6/1999 | Silverthorn et al. |
| 6,125,399 | A | 9/2000 | Hamilton |
| 6,230,218 | B1 | 5/2001 | Casper et al. |
| 6,338,105 | B1 | 1/2002 | Niizuma et al. |
| 6,343,335 | B1 | 1/2002 | Dahman et al. |
| 6,347,334 | B1 | 2/2002 | Fredericks et al. |
| 6,401,223 | B1 | 6/2002 | DePenning |
| 6,466,590 | B1 | 10/2002 | Park et al. |
| 6,546,435 | B1 | 4/2003 | Yoshimura et al. |
| 6,584,511 | B1 | 6/2003 | Marsh, III et al. |
| 6,594,785 | B1 | 7/2003 | Gilbertson et al. |
| 6,609,161 | B1 | 8/2003 | Young |
| 6,609,165 | B1 | 8/2003 | Frazier |
| 6,647,016 | B1 | 11/2003 | Isoda et al. |
| 6,687,766 | B1 | 2/2004 | Casper et al. |
| 6,693,880 | B2 | 2/2004 | Gregg et al. |
| 6,694,390 | B1 | 2/2004 | Bogin et al. |
| 6,751,680 | B2 | 6/2004 | Langerman et al. |
| 6,826,661 | B2 | 11/2004 | Umbehocker et al. |
| 6,839,773 | B2 | 1/2005 | Vishlitzky et al. |
| 6,862,322 | B1 | 3/2005 | Ewen et al. |
| 6,877,043 | B2 | 4/2005 | Mallory et al. |
| 6,882,634 | B2 | 4/2005 | Bagchi et al. |
| 6,898,202 | B2 | 5/2005 | Gallagher et al. |
| 6,910,149 | B2 | 6/2005 | Perloff et al. |
| 6,915,378 | B2 | 7/2005 | Roberti |
| 7,000,036 | B2 | 2/2006 | Carlson et al. |
| 7,035,540 | B2 | 4/2006 | Finan et al. |
| 7,046,665 | B1 | 5/2006 | Walrand et al. |
| 7,058,735 | B2 | 6/2006 | Spencer |
| 7,111,130 | B2 | 9/2006 | Blake et al. |
| 7,120,728 | B2 | 10/2006 | Krakirian et al. |
| 7,124,207 | B1 | 10/2006 | Lee et al. |
| 7,133,988 | B2 | 11/2006 | Fujibayashi |
| 7,142,520 | B1 | 11/2006 | Haverinen et al. |
| 7,149,823 | B2 | 12/2006 | Miller et al. |
| 7,155,569 | B2 | 12/2006 | Johnson et al. |
| 7,164,425 | B2 | 1/2007 | Kwak et al. |
| 7,202,801 | B2 | 4/2007 | Chou |
| 7,266,296 | B2 | 9/2007 | Ovadia et al. |
| 7,277,387 | B2 | 10/2007 | Sanders et al. |
| 7,292,597 | B2 | 11/2007 | Mills et al. |
| 7,315,911 | B2 | 1/2008 | Davies et al. |
| 7,382,733 | B2 | 6/2008 | Banerjee et al. |
| 7,395,284 | B2 | 7/2008 | Sato et al. |
| 7,398,335 | B2 | 7/2008 | Sonksen et al. |
| 7,500,030 | B2 | 3/2009 | Hathorn et al. |
| 7,539,777 | B1 | 5/2009 | Aitken |
| 7,543,087 | B2 | 6/2009 | Philbrick et al. |
| 7,558,827 | B2 | 7/2009 | Kawashima et al. |
| 7,577,772 | B2 | 8/2009 | Sonksen et al. |
| 7,577,773 | B1 | 8/2009 | Gandhi et al. |
| 7,594,057 | B1 | 9/2009 | Gandhi et al. |
| 7,711,871 | B1 | 5/2010 | Haechten et al. |
| 7,743,197 | B2 | 6/2010 | Chavan et al. |
| 7,765,336 | B2 | 7/2010 | Butler et al. |
| 7,826,349 | B2 | 11/2010 | Kaur et al. |
| 7,840,717 | B2 | 11/2010 | Flanagan et al. |
| 7,840,718 | B2 | 11/2010 | Ricci et al. |
| 7,856,511 | B2 | 12/2010 | Ricci et al. |
| 7,941,570 | B2 | 5/2011 | Flanagan et al. |
| 8,495,253 | B2 | 7/2013 | Flanagan et al. |
| 2001/0030943 | A1 | 10/2001 | Gregg et al. |
| 2002/0062407 | A1 | 5/2002 | Tateyama et al. |
| 2002/0099967 | A1 | 7/2002 | Kawaguchi |
| 2002/0152338 | A1 | 10/2002 | Elliott et al. |
| 2003/0002492 | A1 | 1/2003 | Gallagher et al. |
| 2003/0056000 | A1 | 3/2003 | Mullendore et al. |
| 2003/0084213 | A1 | 5/2003 | Brice, Jr. et al. |
| 2003/0158998 | A1 | 8/2003 | Smith |
| 2003/0188053 | A1 | 10/2003 | Tsai |
| 2003/0208581 | A1 | 11/2003 | Behren et al. |
| 2004/0030822 | A1 | 2/2004 | Rajan et al. |
| 2004/0113772 | A1 | 6/2004 | Hong Chou |
| 2004/0136241 | A1 | 7/2004 | Rapp et al. |
| 2004/0151160 | A1 | 8/2004 | Sanders et al. |
| 2004/0193968 | A1 | 9/2004 | Dugan et al. |
| 2004/0260851 | A1 | 12/2004 | Tu |
| 2005/0018673 | A1 | 1/2005 | Dropps et al. |
| 2005/0102456 | A1 | 5/2005 | Kang |
| 2005/0105456 | A1 | 5/2005 | Cookson et al. |
| 2005/0108251 | A1 | 5/2005 | Hunt |
| 2005/0175341 | A1 | 8/2005 | Ovadia |
| 2005/0229033 | A1 | 10/2005 | Tanaka et al. |
| 2006/0050726 | A1 | 3/2006 | Ahmed et al. |
| 2006/0159112 | A1 | 7/2006 | Sundaram et al. |
| 2007/0005838 | A1 | 1/2007 | Chang et al. |
| 2007/0016554 | A1 | 1/2007 | Dapp et al. |
| 2007/0061463 | A1 | 3/2007 | Hiramatsu et al. |
| 2007/0091497 | A1 | 4/2007 | Mizuno et al. |
| 2007/0162631 | A1 | 7/2007 | Balakrishnan et al. |
| 2007/0174544 | A1 | 7/2007 | Yasuda et al. |
| 2007/0239944 | A1 | 10/2007 | Rupanagunta et al. |
| 2008/0040519 | A1 | 2/2008 | Starr et al. |
| 2008/0059638 | A1 | 3/2008 | Hathorn et al. |
| 2008/0147889 | A1* | 6/2008 | Casper et al. .............. 710/5 |
| 2008/0147890 | A1 | 6/2008 | Casper et al. |
| 2008/0235553 | A1 | 9/2008 | Chintada |
| 2008/0256264 | A1 | 10/2008 | Muto et al. |
| 2008/0273518 | A1 | 11/2008 | Pratt |
| 2008/0307122 | A1 | 12/2008 | Butler et al. |
| 2009/0049241 | A1 | 2/2009 | Ohno et al. |
| 2009/0144586 | A1 | 6/2009 | Casper et al. |
| 2009/0172203 | A1 | 7/2009 | Casper et al. |
| 2009/0210557 | A1 | 8/2009 | Gainey, Jr. et al. |
| 2009/0210559 | A1 | 8/2009 | Flanagan et al. |
| 2009/0210560 | A1 | 8/2009 | Yudenfriend et al. |
| 2009/0210561 | A1 | 8/2009 | Ricci et al. |
| 2009/0210562 | A1 | 8/2009 | Huang et al. |
| 2009/0210564 | A1 | 8/2009 | Ricci et al. |
| 2009/0210570 | A1 | 8/2009 | Bendyk et al. |
| 2009/0210571 | A1 | 8/2009 | Casper et al. |
| 2009/0210572 | A1 | 8/2009 | Yudenfriend et al. |
| 2009/0210573 | A1 | 8/2009 | Yudenfriend et al. |
| 2009/0210576 | A1 | 8/2009 | Casper et al. |
| 2009/0210579 | A1 | 8/2009 | Bendyk et al. |
| 2009/0210580 | A1 | 8/2009 | Bendyk et al. |
| 2009/0210581 | A1 | 8/2009 | Flanagan et al. |
| 2009/0210582 | A1 | 8/2009 | Bendyk et al. |
| 2009/0210583 | A1 | 8/2009 | Bendyk et al. |
| 2009/0210584 | A1 | 8/2009 | Carlson et al. |
| 2009/0210585 | A1 | 8/2009 | Ricci et al. |
| 2009/0210768 | A1 | 8/2009 | Carlson et al. |
| 2009/0210769 | A1 | 8/2009 | Casper et al. |
| 2009/0210884 | A1 | 8/2009 | Ricci et al. |
| 2009/0307388 | A1 | 12/2009 | Tchapda |
| 2010/0014526 | A1 | 1/2010 | Chavan et al. |
| 2010/0030919 | A1 | 2/2010 | Flanagan et al. |

(56) References Cited

U.S. PATENT DOCUMENTS

| 2010/0030920 | A1 | 2/2010 | Casper et al. |
| 2010/0064072 | A1 | 3/2010 | Tang et al. |
| 2010/0299460 | A1 | 11/2010 | Wang |

FOREIGN PATENT DOCUMENTS

| GB | 2291990 | 2/1996 |
| JP | 63236152 | 10/1988 |
| JP | 2006505044 A | 2/2006 |
| JP | 2010-140127 A | 6/2010 |
| WO | WO2006102664 A2 | 9/2006 |

OTHER PUBLICATIONS

U.S. Appl. No. 12/031,038 Non-Final Office Action dated Nov. 16, 2009.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
Iren, et al.; "The Transport Layer: Tutorial and Survey"; ACM Computing Surveys; vol. 31, No. 4; Dec. 1999; pp. 360-405.
International Search Report and Written Opinion for PCT/EP2009/051447 dated Jul. 1, 2009.
International Search Report and Written Opinion for PCT/EP2009/051483 dated Jul. 27, 2009.
Nordstrom.; "Sequence Reception Method for a Fibre Channel Protocol Chip"; IBM Technical Disclosure Bulletin; vol. 38, No. 12; Dec. 1995; pp. 267-269.
U.S. Appl. No. 11/548,060 Non-Final Office Action dated Apr. 15, 2008.
U.S. Appl. No. 11/548,093 Non-Final Office Action dated Apr. 17, 2008.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
U.S. Appl. No. 12/183,315, filed Jul. 31, 2008.
U.S. Appl. No. 12/183,323, filed Jul. 31, 2008.
U.S. Appl. No. 12/183,305, filed Jul. 31, 2008.
"z/Architecture-Principles of Operation," IBM Publication No. SA22-7832-04, 5th Ed., Sep. 2005, 1144 pages.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
U.S. Appl. No. 12/031,042, Non-Final Office Action Mailed Sep. 30, 2011.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Brice, et al.; U.S. Appl. No. 11/464,613; "Flexibility Controlling the Transfer of Data Between Input/Output Devices and Memory"; Filed Aug. 15, 2006; Specification having 23 pages and Drawings having 4 sheets.
Casper, et al.; U.S. Appl. No. 11/548,060; "Facilitating Input/Output Processing by Using Transport Control Words to Reduce Input/Output Communications"; Filed Oct. 16, 2006; Specification having 32 pages and Drawings having 12 sheets.
Casper, et al.; U.S. Appl. No. 11/548,093; "Facilitating Access to Status and Measurement Data Associated With Input/Output Processing"; Filed Oct. 16, 2006; Specification having 33 pages and Drawings having 12 sheets.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
IBM® z/Architecture Principles of Operation, Publication No. SA22-7832-05, 6th Edition, Apr. 2007. 1,215 pages separated into 4 electronic attachments.
Peterson, David; "Information Technology, Fibre Channel Protocol for SCSI, Fourth Version (FCP-3)", Draft Proposed American National Standard, Jun. 2004; pp. 1-142.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Nively, et al.; "Fibre Channel, Framing and Signaling"; (FC-FS) Rev. 1.70; NCITS Working Draft Proposed American National Standard for Information Technology; Feb. 2002; pp. i-575.
U.S. Appl. No. 12/030,912, Final Office Action Mailed Feb. 27, 2012.
U.S. Appl. No. 12/031,182 Non-Final Office Action dated Mar. 16, 2012.
U.S. Appl. No. 12/030,981, Notice of Allowance mailed Jan. 27, 2012.
U.S. Appl. No. 12/031,023, Notice of Allowance Mailed Jul. 5, 2012.
U.S. Appl. No. 12/031,042, Notice of Allowance Mailed Feb. 29, 2012.
U.S. Appl. No. 13/150,539, Non-Final Office Action Mailed Mar. 2, 2012.
U.S. Appl. No. 13/173,733, Non-Final Office Action Mailed Feb. 7, 2012.

(56) References Cited

OTHER PUBLICATIONS

Behrs, JR, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.
Final Office Action for U.S. Appl. No. 12/030,912 mailed Oct. 6, 2010.
U.S. Appl. No. 12/031,182 Final Office Action Mailed Jul. 22, 2010.
U.S. Appl. No. 12/030,920 Notice of Allowance Mailed Aug. 23, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,042, Final Office Action Mailed Oct. 25, 2010.
U.S. Appl. No. 12/031,021, Notice of Allowance Mailed Jul. 8, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Moore et al., Reconfiguration of Storage Elements to Improve Performance, IBM, Dec. 1983, pp. 1-3. http://priorartdatabas.com/IPCOM/000047719.
U.S. Appl. No. 12/183,315, Notice of Allowance Mailed on Jun. 15, 2010.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/030,975, Notice of Allowance Mailed Oct. 19, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
URL, http://en.wikipedia.org/wiki/FICON, FICON, Wikipedia, USA, Wikimedia Foundation, Inc., Aug. 9, 2011, 3 pages.
U.S. Appl. No. 13/024,468, Non Final Office Action Mailed Jan. 26, 2012.
U.S. Appl. No. 13/075,993, Final Office Action Mailed Feb. 13, 2012.
U.S. Appl. No. 12/031,023, Non-Final Office Action Mailed Feb. 1, 2012.
U.S. Appl. No. 12/030,993 Notice of Allowance Mailed Dec. 22, 2011.
U.S. Appl. No. 13/150,583, Non-Final Office Action Mailed Feb. 3, 2012.
U.S. Appl. No. 13/173,772 Non Final Office Action Mailed Feb. 3, 2012.
Aboda, B.-et al.; Network Working Group; "Securing Block Storage Protocols Over IP"; ACM Digital Library; RFC3723; Apr. 2004, pp. 1-66.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009, pp. 1-7.
Hewlett-Packard Company; HP A4800A PCI FWD SCSI Host Bus Adapter—Service & User Guide, Edition 6; Google/H-P; 2001, pp. 1-64.
Hewlett-Packard Company; "HP A5149 PCI Ultra2 SCSI Host Bus Adapter—Service and User Guide", Edition 2; Google/H-P; 2001, pp. 1-66.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008, pp. 1-6.
Josephson, WK.-et al.; "DFS: A File System for Virtualized Flash Storage"; ACM Digital Library; vol. 6, No. 3, Article 14, Sep. 2010, pp. 1-15.
LSI Corporation; "PCI Express to 6Gb/s SAS Host Bus Adapters"; Google; Chapter 1, Introduction/Overview; LSI User Guide; Oct. 2009, pp. 1-28.
LSI; "ScsiPortGetDeivceBase"; Google/Lsi; Apr. 2003, pp. 1-14.
Magoutis, K.; "The Optimistic Direct Access File System: Design and Network Interface Support"; Division of Engineering & Applied Science, Harvard Univ.; Feb. 2002, pp. 1-12.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007, pp. 1-7.
Sun, Oracle; "Sun Storage 6 Gb SAS PCIe HBA, External—Installation Guide for HBA Models"; Google; Revision A; Nov. 2010, 80 pages.
Petersen, MK.-et al.; "DIF/DIX Aware Linux SCSI HBA Interface"; Google; Oracle Linux Engineering; Jul. 2008, pp. 1-8.
Satran, J.-et al.; Network Working Group; "Internet Small Computer Systems Interface (iSCSI)"; ACM Digital Library; RFC3720; Apr. 2004, pp. 1-258.
Vaghani, SB.; "Virtual Machine File System"; VMWare Inc./ACM Digital Library; pp. 57-69; 2008-2009.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
U.S. Appl. No. 12/183,323, Non-Final Office Action Mailed Jan. 3, 2011.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 13/833,378, Notice of Allowance Mailed Dec. 6, 2013.

\* cited by examiner

PROVIDING INDIRECT DATA ADDRESSING FOR A CONTROL BLOCK AT A CHANNEL SUBSYSTEM OF AN I/O PROCESSING SYSTEM

CROSS-REFERENCE TO RELATED APPLICATIONS

This application is a continuation of U.S. patent application Ser. No. 13/351,073, filed on Jan. 16, 2012, which is a continuation of U.S. patent application Ser. No. 12/031,201, filed Feb. 14, 2008, the disclosures of which are incorporated by reference herein in their entirety.

BACKGROUND OF THE INVENTION

1. Field of Invention

The present disclosure relates generally to input/output (I/O) processing, and in particular, to providing indirect data addressing for a control block at a channel subsystem of an I/O processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the I/O command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. Simplifying the role of channels in communication may include grouping multiple commands into a single I/O operation. Altering command sequences by grouping two or more commands together in a single I/O operation results in a larger data area required for storing the commands and a data area whose length varies depending on the size and number of commands that are grouped within the single I/O operation.

Currently, a single I/O operation can support a single fixed sized command data area that is referenced by a single direct address. This limits the number of commands that can be grouped together in a single I/O operation and thus, limits the increase in throughput that can be gained by grouping commands. In addition, this limits the way that the commands are stored to a contiguous storage area. Performance may be improved by having the commands spread out in a variety of locations. Accordingly, there is a need in the art to be able to store a plurality of commands making up a single I/O operation in non-contiguous storage and for the amount of storage required to be able to vary between different I/O operations.

BRIEF SUMMARY OF THE INVENTION

An exemplary embodiment includes a computer program product for facilitating input/output (I/O) processing for an I/O operation at a host computer system configured for communication with a control unit. The computer program product includes a tangible storage medium readable by a processing circuit and storing instructions for execution by the processing circuit for performing a method. The method includes: obtaining a transport command word (TCW) for an I/O operation, the TCW specifying a location address and indicating whether the TCW directly or indirectly addresses a message for transmitting one or more commands to the control unit; extracting the specified location address from the TCW; obtaining the message from the specified location address based on the TCW indicating direct addressing, the message including the one or more I/O commands; gathering the one or more I/O commands from command locations specified by a list of addresses identified by the specified location address to form the message based on the TCW indicating indirect addressing; and forwarding the message to the control unit for execution.

Another exemplary embodiment includes an apparatus for providing indirect data addressing for a control block at a host computer system configured for communication with a control unit. The host computer system performs: obtaining a transport command word (TCW) for an I/O operation, the TCW specifying a location address and indicating whether the TCW directly or indirectly addresses a message for transmitting one or more commands to the control unit; extracting the specified location address from the TCW; obtaining the message from the specified location address based on the TCW indicating direct addressing, the message including the one or more I/O commands; gathering the one or more I/O commands from command locations specified by a list of addresses identified by the specified location address to form the message based on the TCW indicating indirect addressing; and forwarding the message to the control unit for execution.

A further exemplary embodiment includes a method for providing indirect data addressing for a control block at a host computer system, the host computer system including a channel subsystem configured for communication with a control unit. The method includes: obtaining a transport command word (TCW) for an I/O operation by the channel subsystem, the TCW specifying a location address and indicating whether the TCW directly or indirectly addresses a message for transmitting one or more commands to the control unit; extracting the specified location address from the TCW;

obtaining the message from the specified location address based on the TCW indicating direct addressing, the message including the one or more I/O commands; gathering the one or more I/O commands from command locations specified by a list of addresses identified by the specified location address to form the message based on the TCW indicating indirect addressing; and forwarding the message to the control unit for execution.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
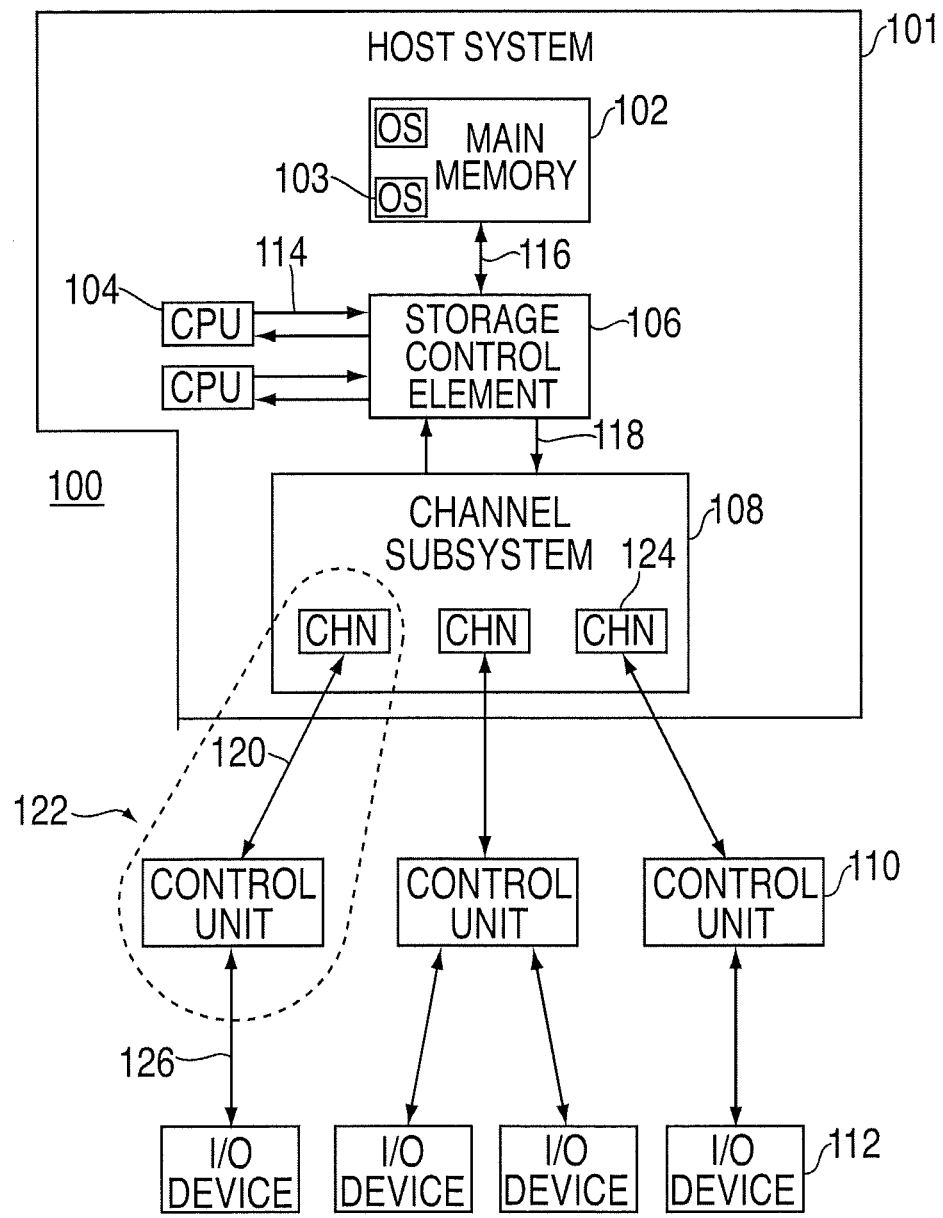
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) is facilitated by allowing a plurality of commands making up a single I/O operation to be stored in non-contiguous storage. Depending on factors such as the number of commands and the amount of associated control data, the length of the required storage may vary from one I/O operation to another I/O operation. An exemplary embodiment of the present invention utilizes a list of indirect addresses to gather command data to be sent to a control unit as part of a single I/O operation. This facilitates I/O processing by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit.

The plurality of commands (e.g., device command words or "DCWs") are included in a block, referred to herein as a transport command control block (TCCB), an address (indirect or direct) of which is specified in a transport control word (TCW). In an exemplary embodiment, the TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by one or more of the CPU 104 and the channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented in any manner known in the art, including an optical link, employing single-mode or multi-mode waveguides in a Fibre Channel fabric (e.g., a fibre channel network). Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch may be coupled to a channel 124 and a control unit 110 and provides the capability of physically interconnecting any two links that are attached to the switch. In another example, it is also possible to have multiple systems, and therefore multiple channel subsystems (not depicted) attached to one or more of the control units 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
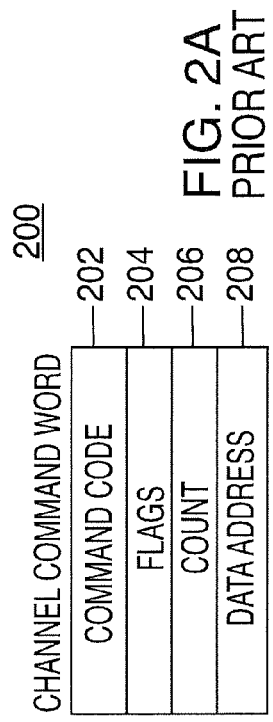
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for example, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW 200 to be transferred; and a data address 208 that points to a location in main memory that includes the data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for example, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 221 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol" (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel 124 and is not sent or seen by the control unit 110.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
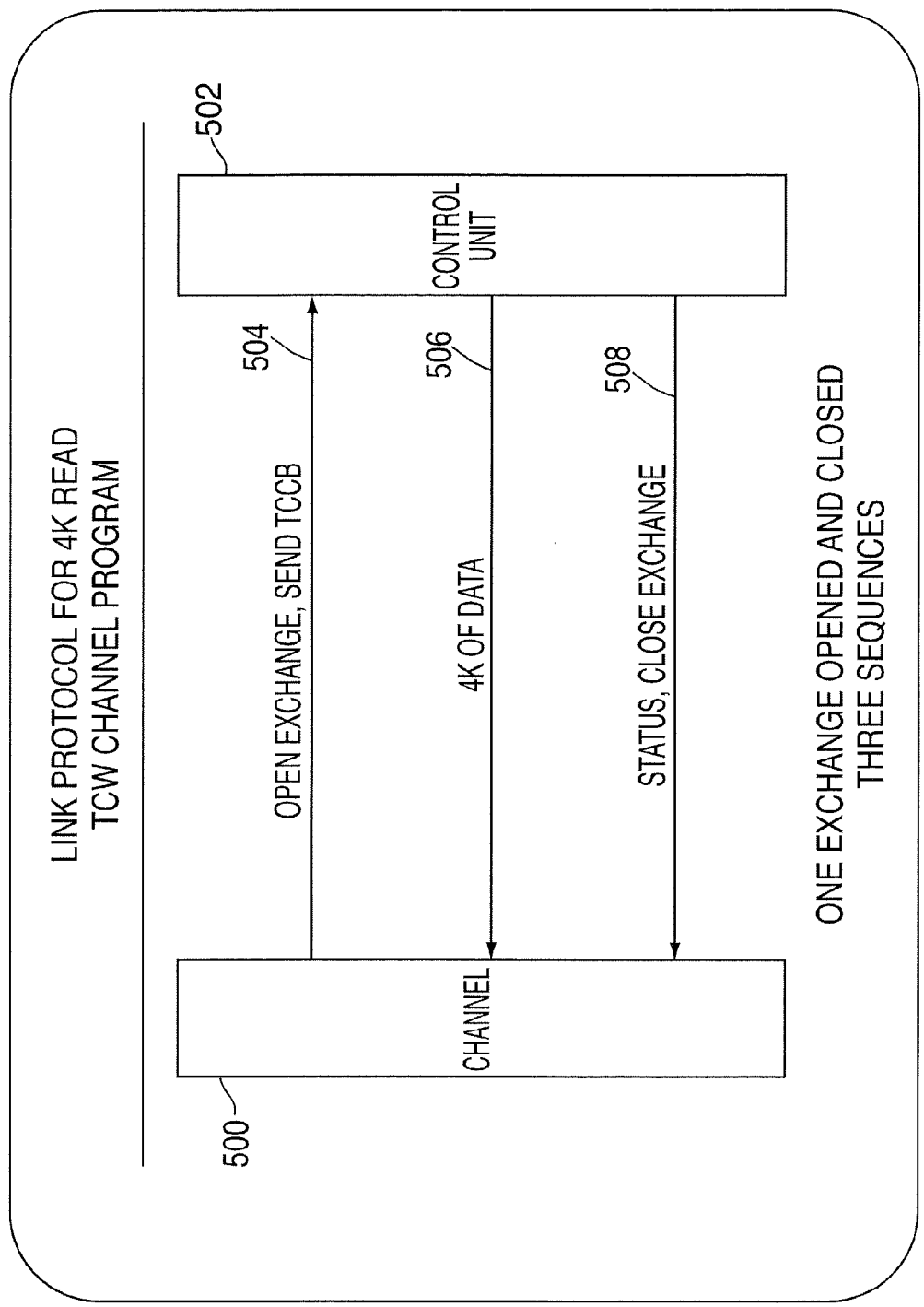
FIG. 5 depicts one embodiment of a link protocol used to communicate between a channel and control unit to execute the TCW channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP_IU, also referred to as a transport response IU. The FCP_RSP_IU payload may be used to transport FICON ending status along with additional status information.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502. (FCP Transfer Ready Disabled)
3. Final status is sent in a FCP status frame that has a bit active in, for instance, byte 10 or 11 of the FCP_RSP_IU Payload. The FCP_RES_INFO field or sense field is used to transport FICON ending status along with additional status information.

Figure 2B:
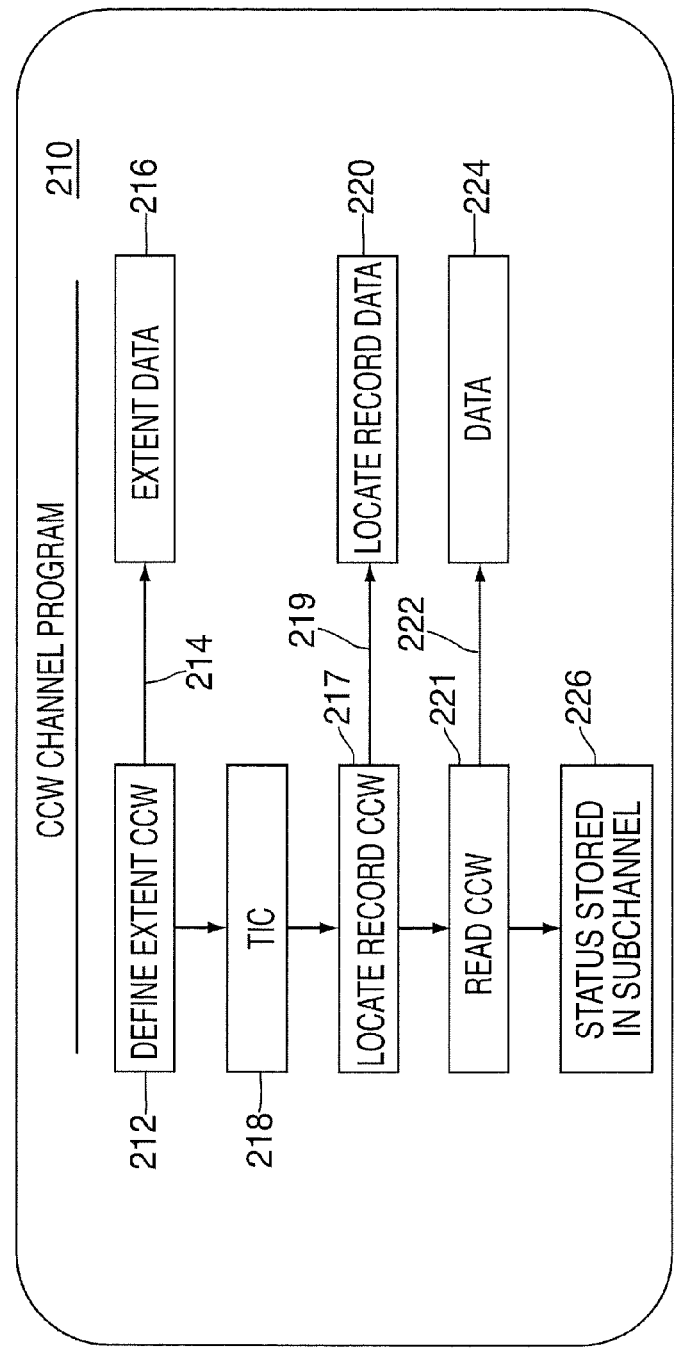
FIG. 2B depicts one example of a prior art channel command word channel program.
Figure 3:
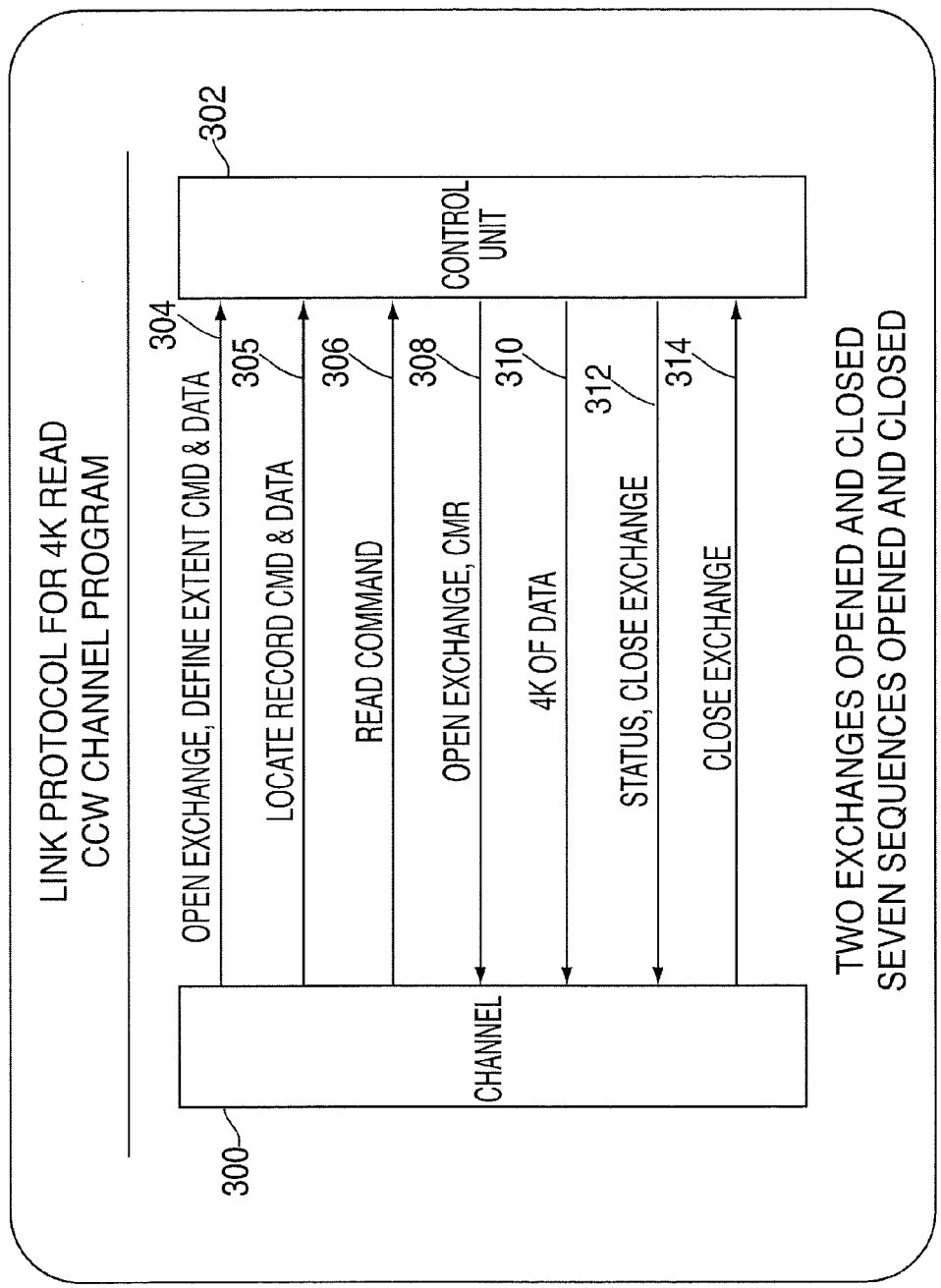
FIG. 3 depicts one embodiment of a prior art link protocol used in communicating between a channel and control unit to execute the channel command word channel program of FIG. 2B.
Figure 4:
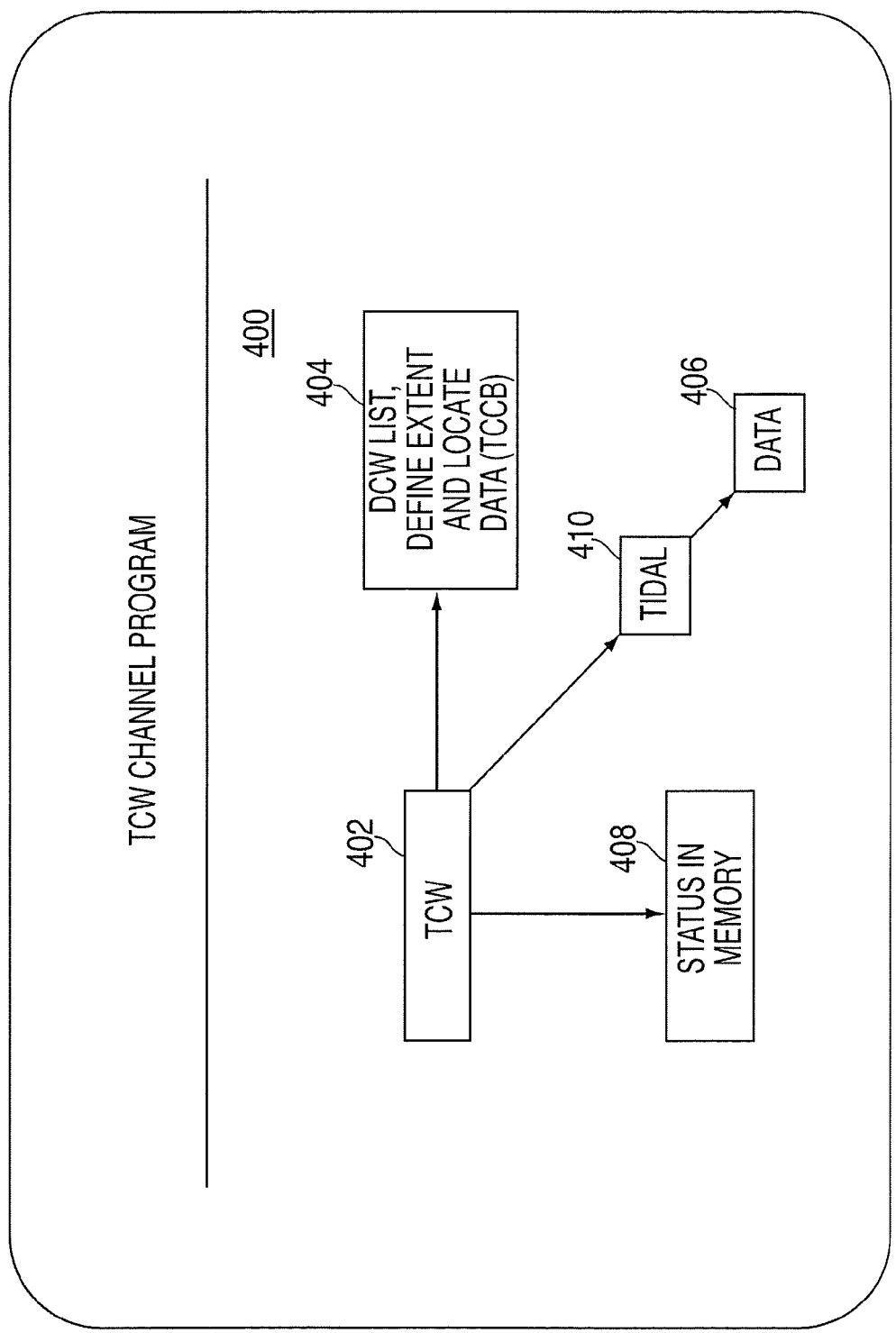
FIG. 4 depicts one embodiment of a transport control word (TCW) channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
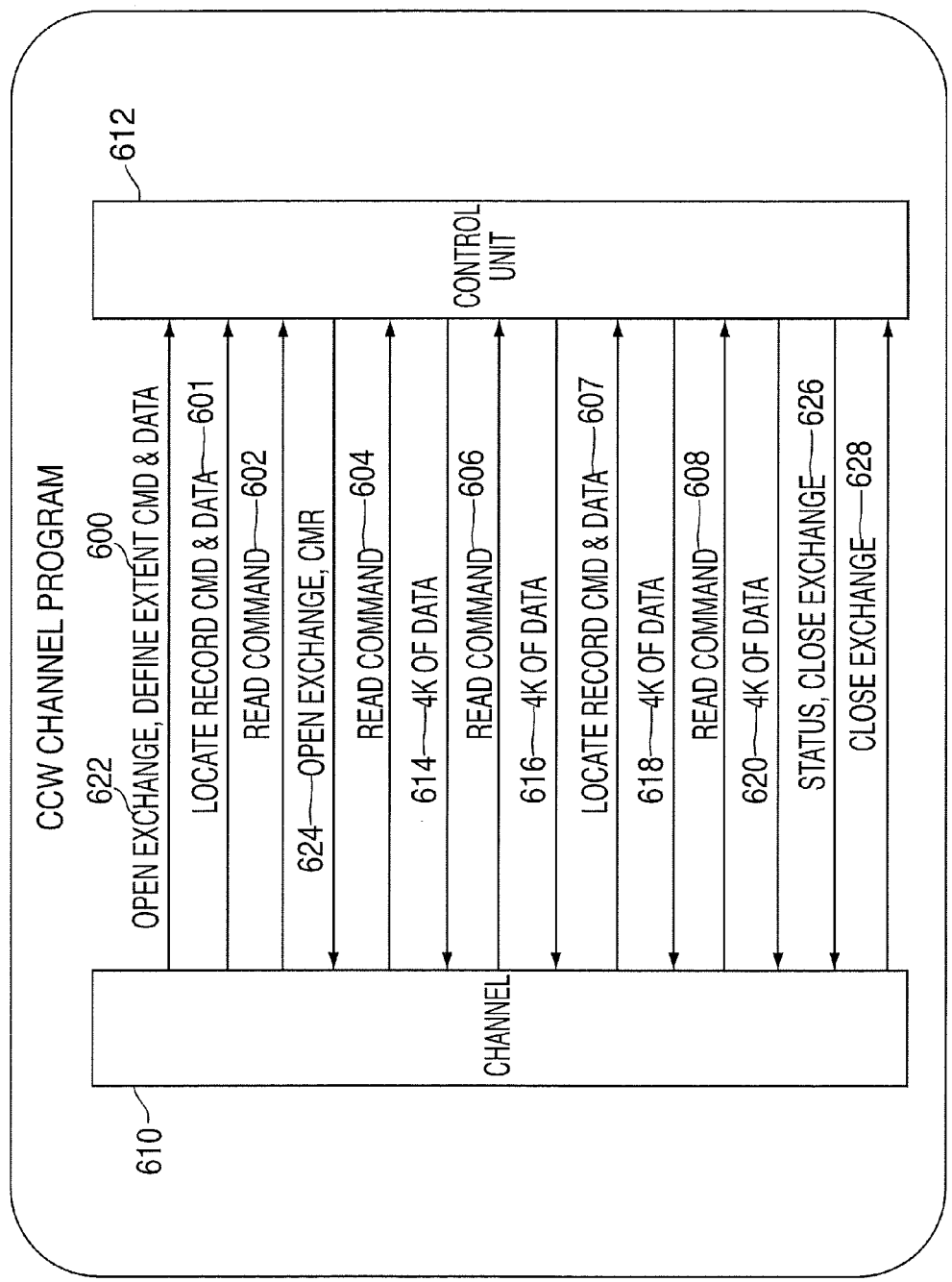
FIG. 6 depicts one embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
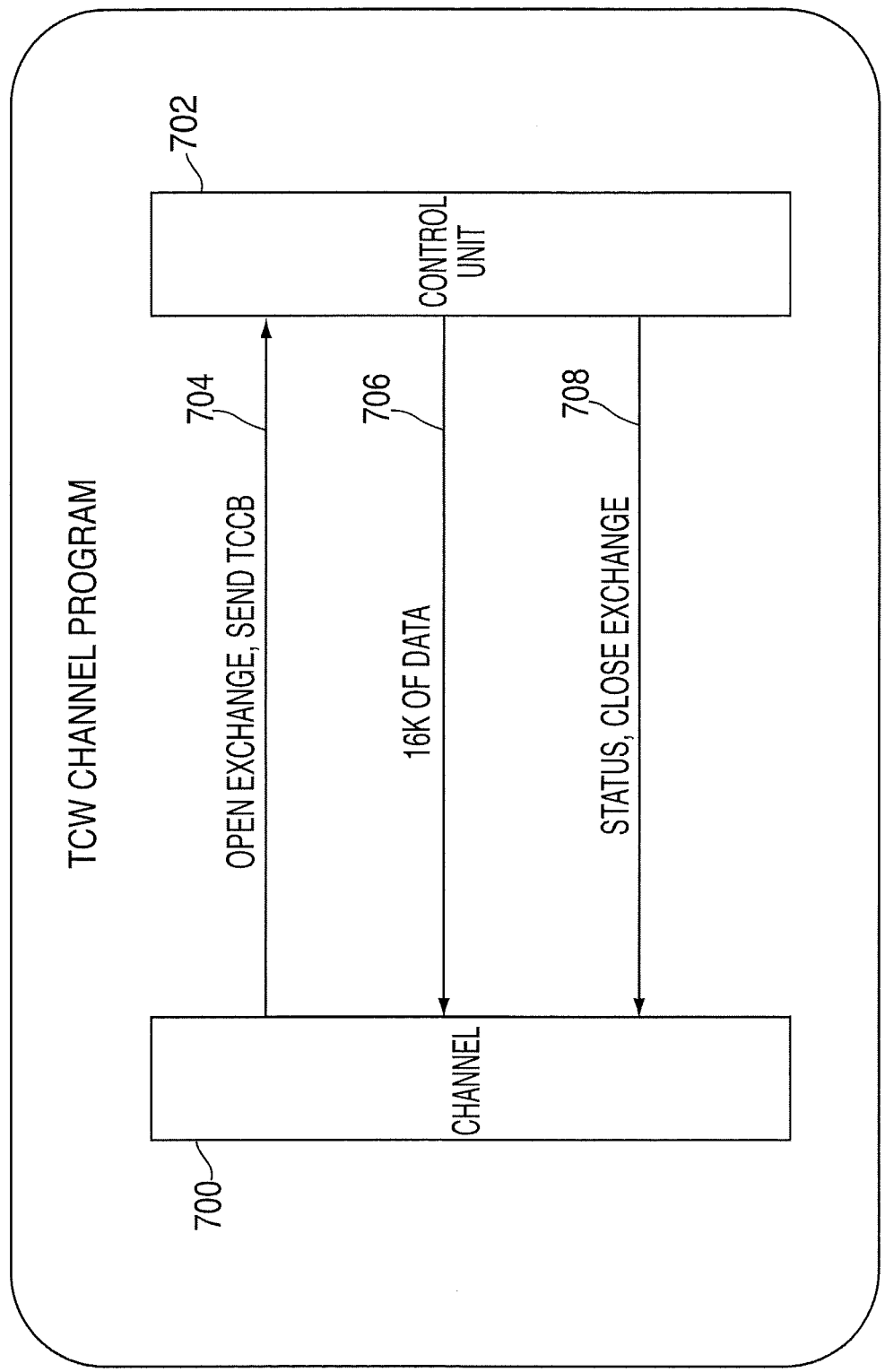
FIG. 7 depicts one embodiment of a link protocol used to communicate between a channel and control unit to process the four read commands of a TCW channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much fewer communications to transfer the same amount of data as the CCW channel program of FIG. 6.

Figure 8:
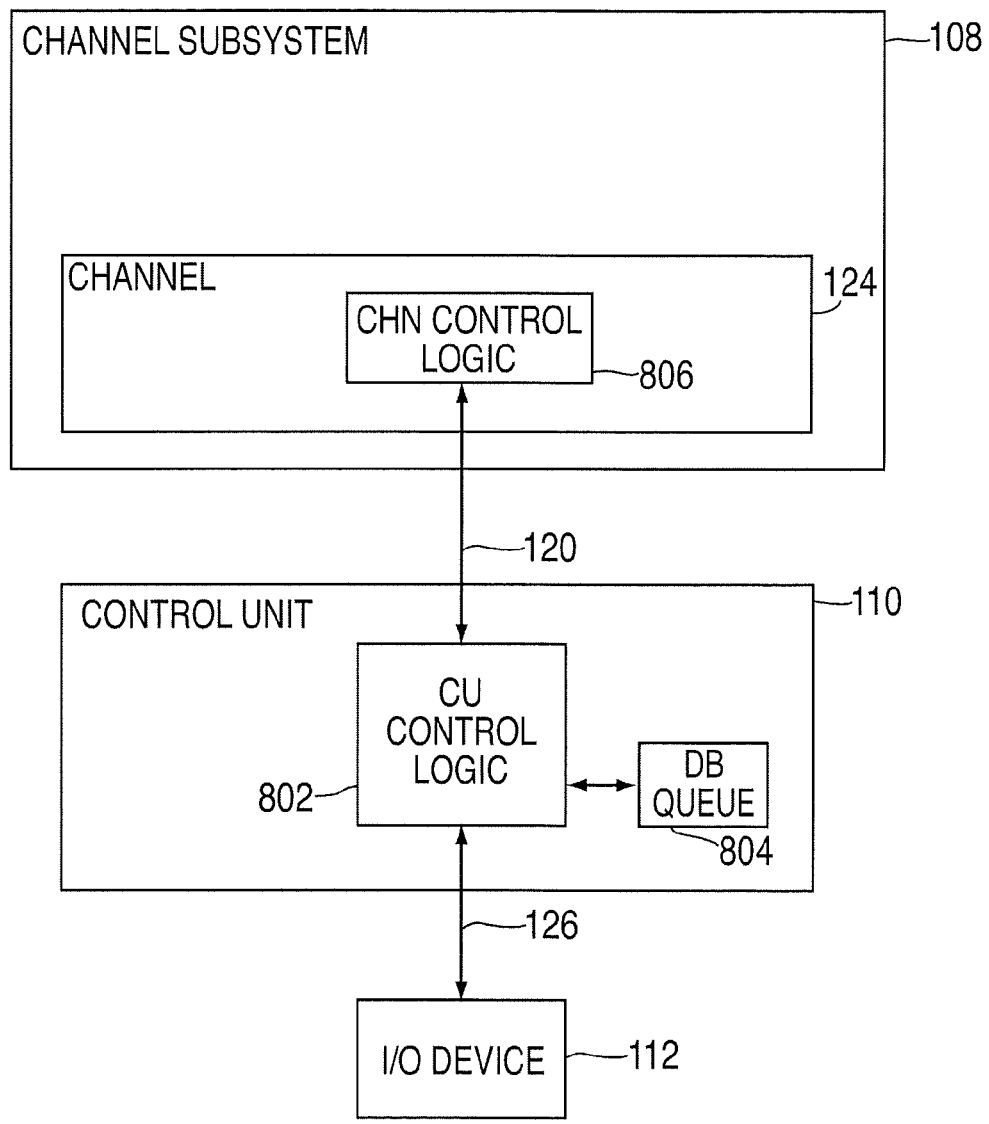
FIG. 8 depicts one embodiment of a control unit and a channel subsystem, in accordance with an aspect of the present invention.

Turning now to FIG. 8, one embodiment of channel 124 in the channel subsystem 108 and the control unit 110 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112 and receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 802 keeps track of and stores device busy messages and associated data in a device busy queue 804.

The control unit 110 may further include other buffer or memory elements (not depicted) to store multiple messages or status information associated with communications between the channel 124 and the I/O device 112. For example, a register located on the control unit 110 may include a maximum control unit exchange parameter that defines the maximum number of open control unit exchanges that the control unit 110 supports.

The channel 124 in the channel subsystem 108 includes elements to support communication with the control unit 110. In an exemplary embodiment, the CHN control logic 806 controls communication between the channel subsystem 108 and the control unit 110. The CHN control logic 806 may directly interface to the CU control logic 802 via the connection 120 to send commands and receive responses, such as transport command and response IUs. Alternatively, messaging interfaces and/or buffers (not depicted) can be placed between the CHN control logic 806 and the CU control logic 802.

Figure 9:
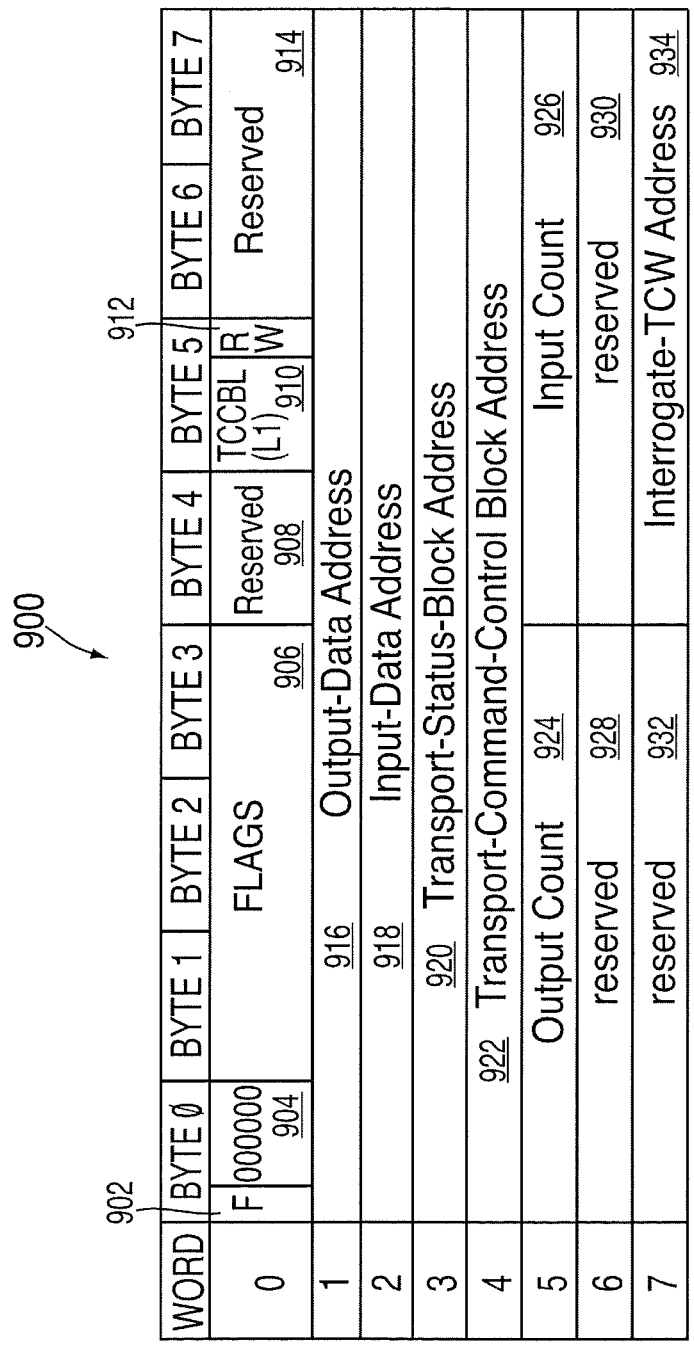
FIG. 9 depicts one embodiment of a TCW in accordance with an aspect of the present invention.

An exemplary embodiment of a transport control word (TCW) 900 is depicted in FIG. 9. The TCW 900 is utilized by the channel 124 to set up the I/O operation and is not sent to the control unit 110. The TCW depicted in FIG. 9 provides for indirect addressing of a TCCB by utilizing a TCCB TIDAL flag and a TCCB address.

In an exemplary TCW 900 depicted in FIG. 9, a format field 902 equal to "00b" indicates that what follows is a TCW 900. The TCW 900 also includes reserved bits 904 for possible future use.

The TCW 900 also includes a flags field 906. The first five bits of the flags field 906 are reserved for future use and are set to zero. The sixth bit of the flags field 906 is a TIDAL read flag. In an exemplary embodiment, the TIDAL read flag is set (e.g., to one) when the input-data address field 918 contains an address of a TIDAL. If the TIDAL read flag is reset (e.g., to zero), then the input-data address field 918 contains a data address. The seventh bit of the flags field 906 is the TCCB TIDAL flag. In an exemplary embodiment, the TCCB TIDAL flag is set to one when the TCCB address field 922 contains an address of a TIDAL. If the TCCB TIDAL flag is set to zero, then the TCCB address field 922 directly addresses the TCCB. The TCCB TIDAL flag allows the operating system software or the hyper-visor to layer function and prefix user channel programs. The eighth bit of the flags field 906 is a TIDAL write flag. In an exemplary embodiment, the TIDAL write flag is set to one when the output-data address field 916 contains an address of a TIDAL. If the TIDAL write flag is set to zero, then the output-data address field 916 contains a data address.

The ninth through twenty-forth bits of the flags field 906 is reserved for future use.

The TCW 900 also includes a TCCB length field 910 which indirectly represents the length of the TCCB and may be utilized to determine the actual length of the TCCB.

The read/write bits 912 in the TCW 900 are utilized to indicate whether data is being read and/or written as a result of executing the TCW 900. In an exemplary embodiment, the read bit in the read/write 912 bits is set to one to indicate that input data is being transferred from an I/O device 112 to system storage (e.g., main memory 102) in the host system 101 as a result of executing the TCW 900. The write bit in the read/write bits 912 is set to one to indicate that output data is being transferred from system storage (e.g., main memory 102) in the host system 101 to an I/O device as a result of executing the TCW 900.

The output-data address field 916 includes the address for the output data (if any). As described previously, the contents of the output-data address field 916 may be an address of a TIDAL for output data or the actual address of the output data. The input-data address field 918 includes the address for the input data (if any). As described previously, the contents of the input-data address field 918 may be an address of a TIDAL for input data or the actual address of the input data. In an exemplary embodiment, the output-data address field 916 and the input data address field 918 are implemented as sixty-four bit addresses.

The TCW 900 also includes a transport-status-block address field 920. A portion (e.g., the extended status part) of a completion status in a transport response IU for an I/O operation is stored at this address. The TCCB address field 922 in the TCW 900 includes an address where the TCCB is located in system storage. As described previously, the TCCB is the control block where the DCWs to be executed for the TCW 900 reside. Also as described previously, the contents of the TCCB address field 922 may be an address of a TIDAL for the TCCB or the actual address of the TCCB. In an exemplary embodiment, the transport-status-block address field 920 and the TCCB address field 922 are implemented as sixty-four bit addresses.

The output count field 924 in the TCW 900 indicates the amount of output data to be transferred by the TCW/TCCB for an output operation. In an exemplary embodiment, the output count field 924 specifies the number of bytes in the output storage area designed by the TCW (the output-data address 916) to be transferred. The input count field 926 in the TCW 900 indicates the amount of input data to be transferred by the TCW/TCCB for an input operation. In an exemplary embodiment, the input count field 926 specifies the number of bytes in the input storage area designed by the TCW (the input-data address 918) to be transferred. Several additional fields in the TCW 900 are reserved: reserved field 928, reserved field 930 and reserved field 932. The interrogate-TCW address field 934 contains the address of another TCW and is used by the channel 124 to interrogate that state of an operation under the initiative of a cancel sub-channel I/O instruction.

The TCW depicted in FIG. 9 is one example of how a command word can be configured. Other configurations are possible where additional fields are included and/or fields depicted in FIG. 9 are not included.

Figure 10:
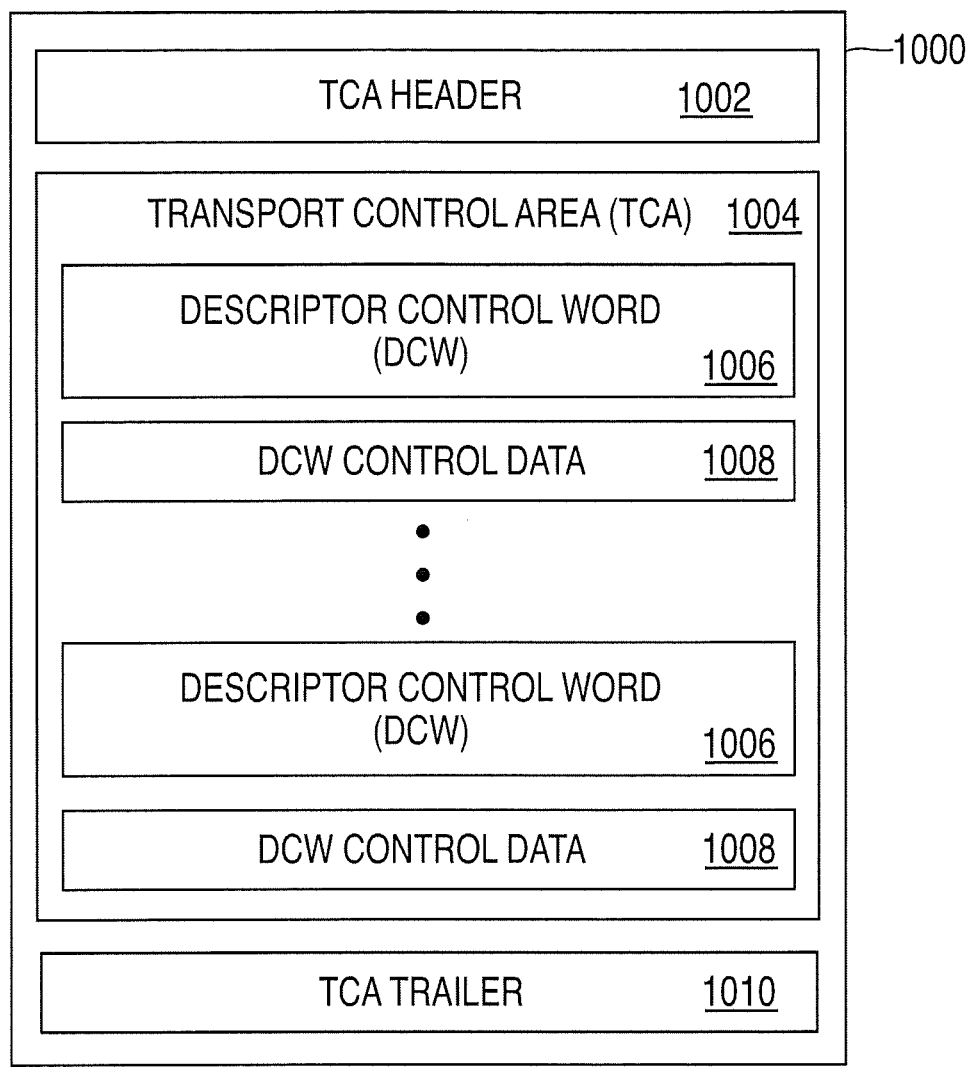
FIG. 10 depicts one embodiment of a TCCB in accordance with an aspect of the present invention.

FIG. 10 depicts one embodiment of a TCCB 1000 in accordance with an aspect of the present invention. The TCCB 1000 in FIG. 10 is located at the address indicated in the TCCB address field 922 in the TCW 900. This address may be a direct address or an indirect address, allowing the contents of the TCCB 1000 to be in one storage location or to be spread among multiple non-contiguous storage locations. As described previously, the TCCB 1000 is a control block built by software and then the channel 124 sends it to a control unit 110 (e.g., in a Transport Command IU) for execution. The TCCB 1000 contains the commands to be executed by the control unit 110 and any control data required by the commands. The channel 124 does not look at the contents of the TCCB 1000. The channel 124 packages the TCCB 1000 and sends it to the control unit 110. This allows FCP transport protocols to be utilized instead of FICON.

The TCCB 1000 includes a transport control area header (TCAH) 1002 which, in an exemplary embodiment, includes information about the transmit control area (TCA) 1004 and operations within the TCA 1004 (e.g., length, service code). In an exemplary embodiment the TCAH 1002 includes a format control field for specifying information such as the format of the TCCB (e.g., variable length CDB format), the mode associated with the TCCB (e.g., transport mode), service action codes set aside to be used as vendor unique code points, and a field to provide the control unit the priority in which to execute this TCCB 1000.

The TCCB 1000 depicted in FIG. 10 also includes a variable length TCA 1004 which includes one or more DCWs 1006 and corresponding DCW control data 1008, if any for each DCW 1006. The DCW control data 1008 may be of variable length. In an exemplary embodiment, each DCW 1006 includes a command code, flags (chaining), control data length, and read/write data length. DCW control data 1008 is optional (depending on the DCW 1006) and includes control parameters for its corresponding DCW 1006. For example, DCW control data 1008 may include define extent and/or prefix parameters. In an exemplary embodiment, the DCW control data 1008 follows its corresponding DCW 1006 within the TCA 1004 and is not pointed to by the DCW 1006.

In addition, the TCCB 1000 includes a TCA trailer (TCAT) 1010 that contains data such as the count of the bytes to be transferred in the TCCB 1000 and a check word field to check the integrity of the TCCB 1000.

Figure 11:
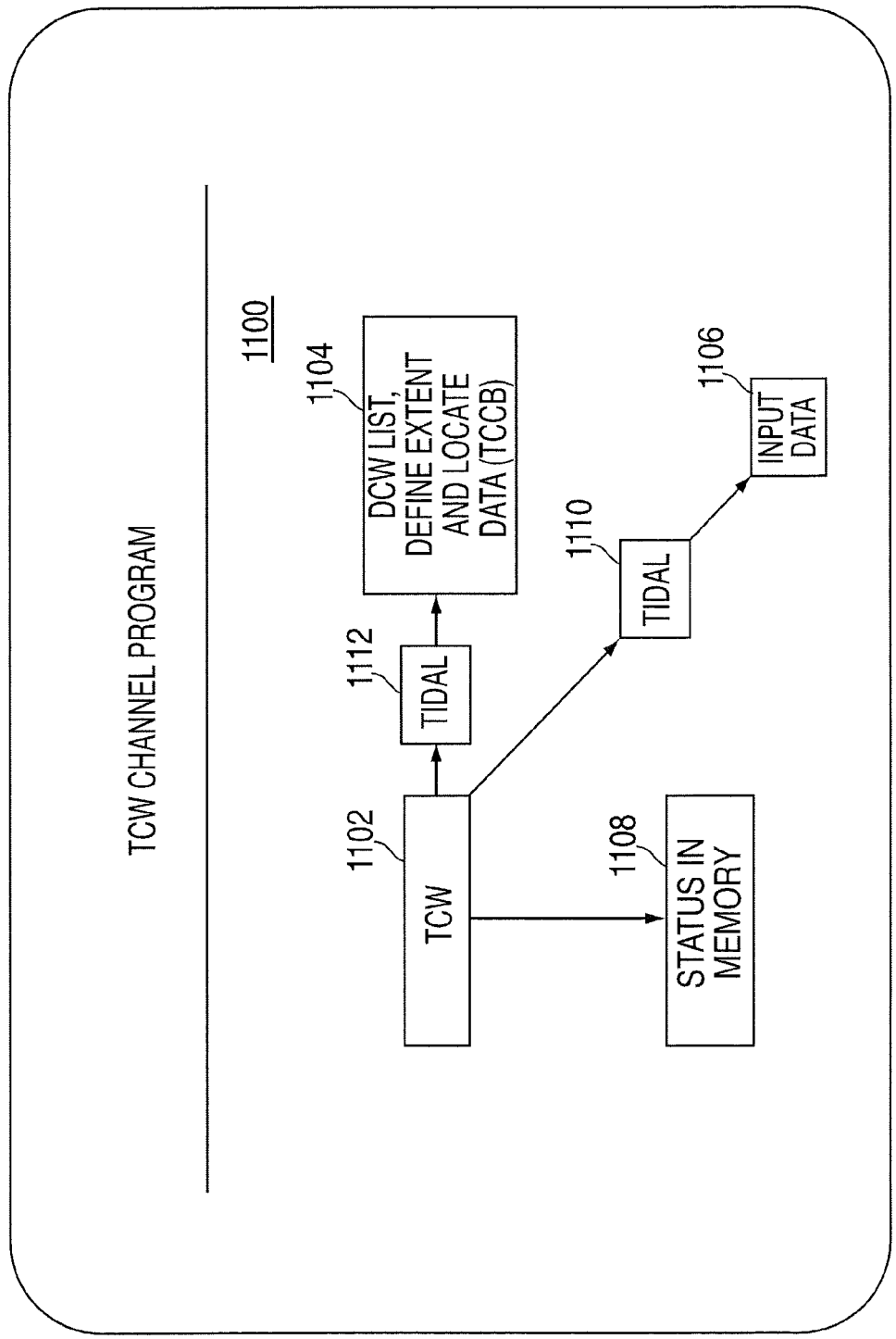
FIG. 11 depicts one embodiment of a TCW channel program, in accordance with an aspect of the present invention.

FIG. 11 depicts one embodiment of a TCW channel program 1100, in accordance with an aspect of the present invention. As shown in FIG. 11, the TCW channel program 1100 includes a TCW 1102 specifying a location in memory of a TCCB 1104 or TIDAL 1112 (i.e., a list of transport indirect data address words (TIDAWs)) that points to the location for the TCCB 1104. In addition, the example channel program 1100 depicted in FIG. 11 includes a location in memory of an input data area 1106 or a TIDAL 1110 that points to the input data area 1106, and a status area 1108.

Figure 12:
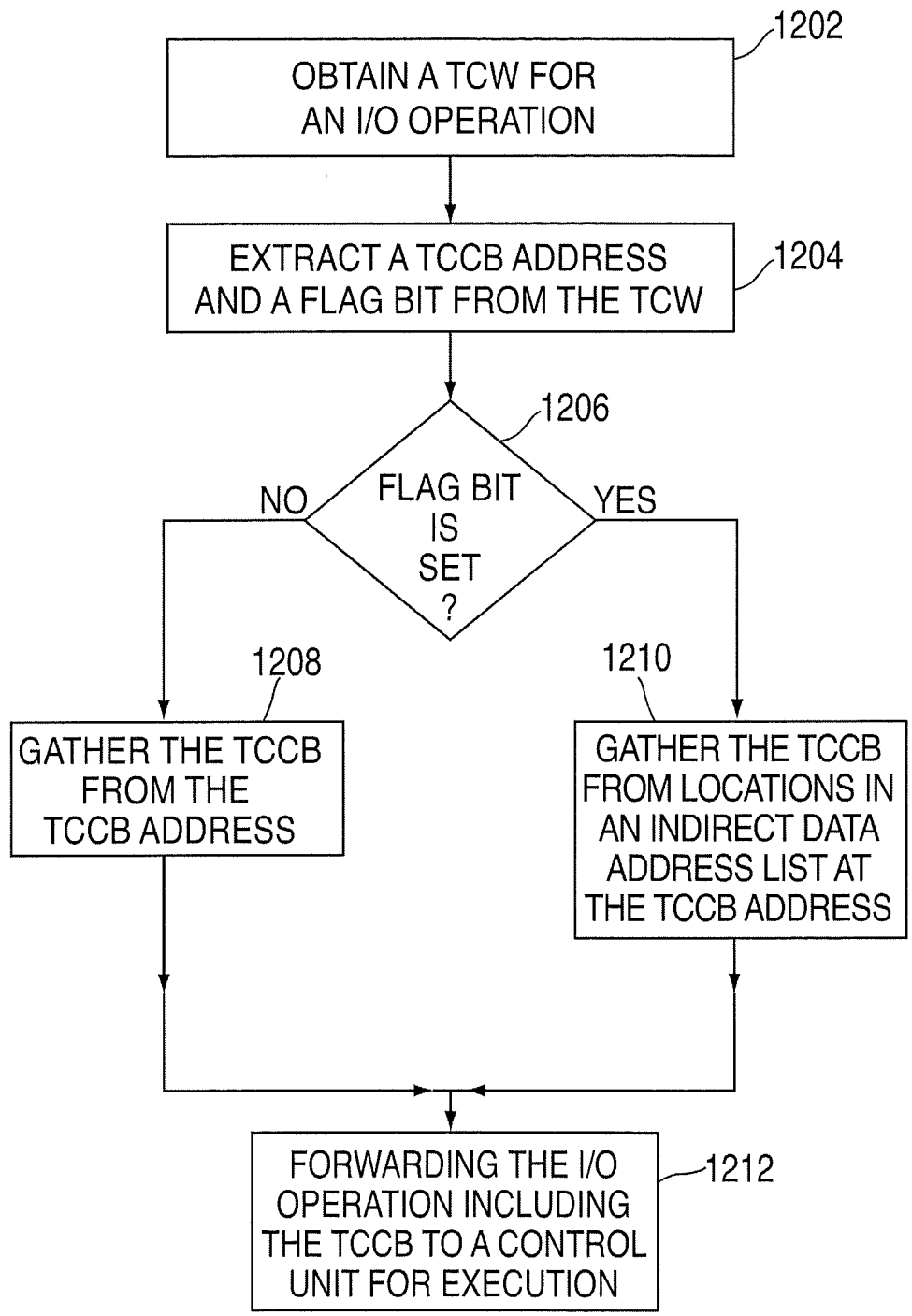
FIG. 12 depicts one embodiment of a process for providing indirect data addressing for a control block.

FIG. 12 depicts one embodiment of a process for providing indirect data addressing for a control block (e.g., a TCCB) in accordance with an aspect of the present invention. In an exemplary embodiment, the processing depicted in FIG. 12 occurs at a host computer system that is in network communication with a control unit. The host computer system may include an I/O processing system that executes the process. Additionally, the I/O processing system may include channel subsystem that executes the process. At block 1202, a TCW is obtained by the host computer. In an exemplary embodiment, the TCW is obtained (or received) from an operating system running on the host computer. The TCW includes a TCCB address 922 and a TCCB TIDAL flag located in the flags field 906. At block 1204, the TCCB address 922 and TCCB TIDAL flags are extracted from the TCW.

At block 1206, it is determined if the TCCB TIDAL flag is set. If the TCCB TIDAL flag is set, then the TCCB address 922 is an indirect data address and processing continues at block 1210. At block 1210, the TCCB is gathered from the location specified by the TCW. Because the address is an indirect address, the TCCB address 922 includes an address of a TIDAL. The TIDAL includes a list of addresses that point to a plurality of storage locations that collectively make up the TCCB. Processing then continues at block 1212.

If the TCCB TIDAL flag is not set, as determined at block 1206, then the TCCB address 922 is a direct data address and processing continues at block 1208. At block 1208, the TCCB is gathered from the location specified by the TCW. Because the address is a direct address, the TCCB is located at the address specified by the TCCB address 922. Processing then continues at block 1212.

At block 1212, the I/O operation, including the TCCB is forwarded to a control unit for execution.

Technical effects of exemplary embodiments include the ability to spread the TCCB among non-contiguous storage locations. This may lead to performance improvements due to the ability to easily add on to contents of the TCCB and due to reduced contention for particular storage locations. Technical effects also include the ability to have a variable length TCCB which allows for flexibility in grouping commands together for transmission to a control unit.

Figure 13:
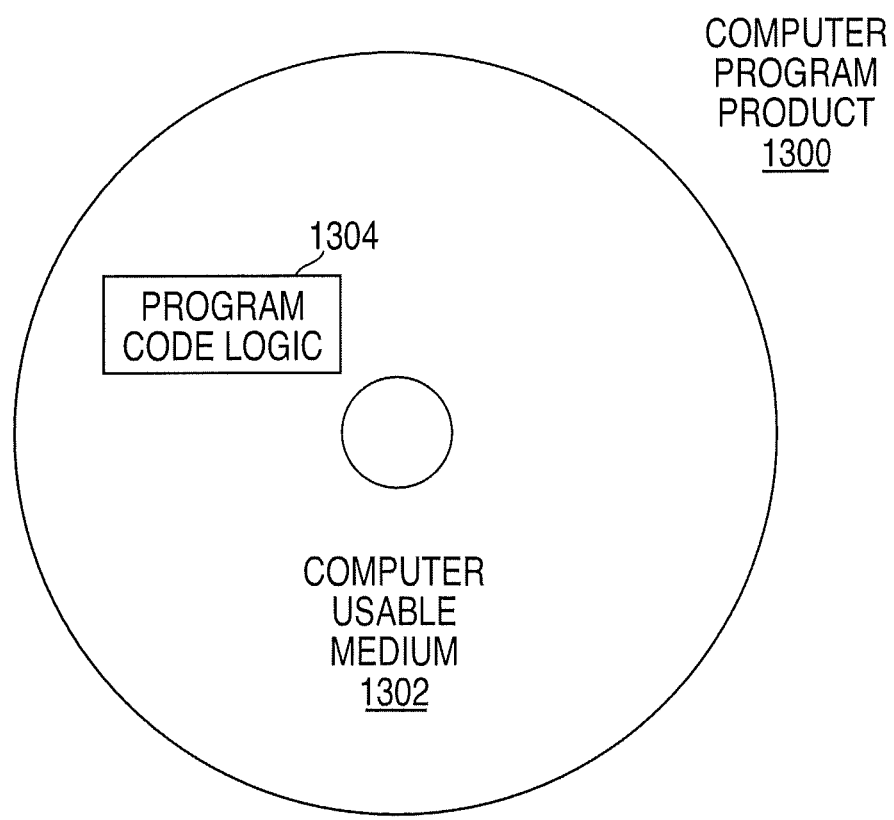
FIG. 13 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1300 as depicted in FIG. 13 on a computer usable medium 1302 with computer program code logic 1304 containing instructions embodied in tangible media as an article of manufacture. Exemplary articles of manufacture for computer usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for facilitating input/output (I/O) processing for an I/O operation at a host computer system configured for communication with a control unit, the computer program product comprising: a non-transitory tangible storage medium readable by a processing circuit and storing instructions for execution by the processing circuit for performing a method comprising: obtaining a transport command word (TCW) for an I/O operation, the TCW specifying a location address and indicating whether the TCW directly or indirectly addresses a message for transmitting one or more commands to the control unit; extracting the specified location address from the TCW; obtaining the message from the specified location address based on the TCW indicating direct addressing, the message including the one or more I/O commands; gathering the one or more I/O commands from command locations specified by a list of addresses identified by the specified location address to form the message based on the TCW indicating indirect addressing; and forwarding the message to the control unit for execution.

2. The computer program product of claim 1, wherein the TCW includes a flag, the flag having a value that indicates whether the TCW directly or indirectly addresses the message, and extracting includes extracting the flag from the TCW.

3. The computer program product of claim 2, wherein the message is obtained based on the flag having a first value indicating direct addressing, and the one or more I/O commands are gathered from the command locations based on the flag having a second value indicating indirect addressing.

4. The computer program product of claim 1, wherein the message is configured to hold a plurality of commands.

5. The computer program product of claim 1, wherein the list of addresses comprises two or more I/O commands, and the forwarded message comprises the two or more I/O commands.

6. The computer program product of claim 1, wherein the message is a transport command control block (TCCB) configured to hold a plurality of I/O commands, and the location specified by the TCW is the location of the TCCB.

7. The computer program product of claim 6, wherein the TCCB further includes a header and a variable length transport control area, the header comprising information about the variable length transport control area, the variable length transport control area comprising one or more I/O commands, the header configured to specify a format of at least one of the one or more I/O commands and the gathered one or more I/O commands.

8. The computer program product of claim 6, wherein the TCCB further includes a trailer for providing a check word and specifying the amount of data to transfer.

9. The computer program product of claim 1, wherein the host computer system includes a channel subsystem and the method is performed by the channel subsystem.

10. An apparatus for providing indirect data addressing for a control block at a host computer system configured for communication with a control unit, the host computer system performing:
  obtaining a transport command word (TCW) for an I/O operation, the TCW specifying a location address and indicating whether the TCW directly or indirectly addresses a message for transmitting one or more commands to the control unit;
  extracting the specified location address from the TCW;
  obtaining the message from the specified location address based on the TCW indicating direct addressing, the message including the one or more I/O commands;
  gathering the one or more I/O commands from a plurality of storage locations specified by a list of addresses identified by the specified location address to form the message based on the TCW indicating indirect addressing; and
  forwarding the message to the control unit for execution.

11. The apparatus of claim 10, wherein the TCW includes a flag, the flag having a value that indicates whether the TCW directly or indirectly addresses the message, and extracting includes extracting the flag from the TCW.

12. The apparatus of claim 11, wherein the message is obtained based on the flag having a first value indicating direct addressing, and the one or more I/O commands are gathered from the command locations based on the flag having a second value indicating indirect addressing.

13. The apparatus of claim 10, wherein the message is configured to hold a plurality of commands.

14. The apparatus of claim 10, wherein the list of addresses comprises two or more I/O commands, and the forwarded message comprises the two or more I/O commands.

15. The apparatus of claim 10, wherein the message is a transport command control block (TCCB) configured to hold a plurality of I/O commands, and the location specified by the TCW is the location of the TCCB.

16. The apparatus of claim 10, wherein at least one of the one or more I/O commands and the gathered one or more I/O commands includes command codes and control data.

17. A method for providing indirect data addressing for a control block at a host computer system, the host computer system including a channel subsystem configured for communication with a control unit, the method comprising:
  obtaining a transport command word (TCW) for an I/O operation by the channel subsystem, the TCW specifying a location address and indicating whether the TCW directly or indirectly addresses a message for transmitting one or more commands to the control unit;
  extracting the specified location address from the TCW;
  obtaining the message from the specified location address based on the TCW indicating direct addressing, the message including the one or more I/O commands;
  gathering the one or more I/O commands from a plurality of storage locations specified by a list of addresses identified by the specified location address to form the message based on the TCW indicating indirect addressing; and
  forwarding the message to the control unit for execution.

18. The method of claim 17, wherein the TCW includes a flag, the flag having a value that indicates whether the TCW directly or indirectly addresses the message, and extracting includes extracting the flag from the TCW.

19. The method of claim 17, wherein the message is configured to hold a plurality of commands.

20. The method of claim 17, wherein the message is a transport command control block (TCCB) configured to hold a plurality of I/O commands, and the location specified by the TCW is the location of the TCCB.

* * * * *